June 4, 1968    H. T. TREACE    3,386,437
COMPRESSION DEVICE FOR USE WITH A BONE FRACTURE PLATE
Filed Jan. 14, 1966
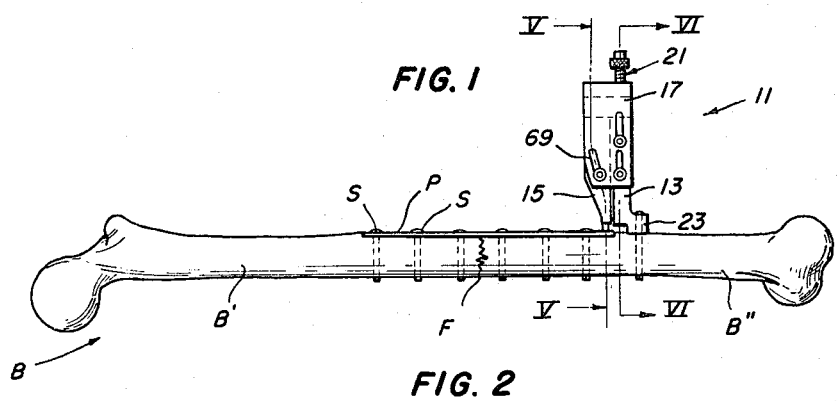
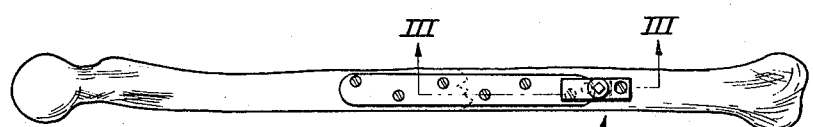
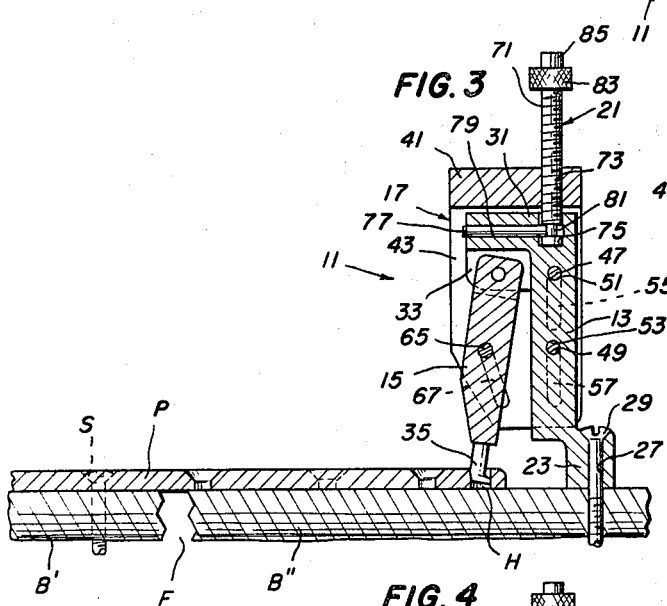
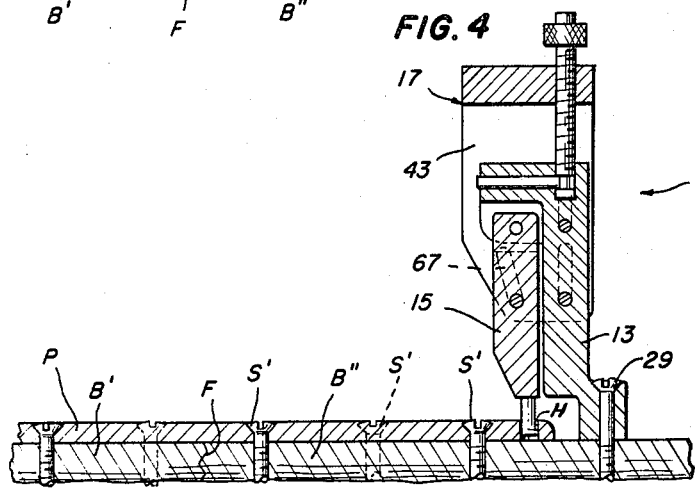
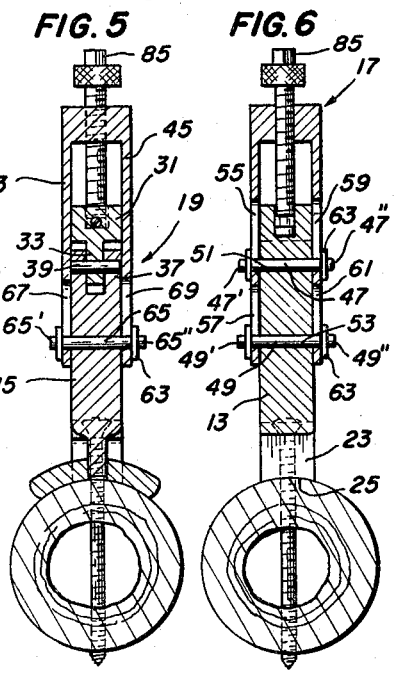
INVENTOR.
HARRY T. TREACE
BY John R. Walker, III
Attorney United States Patent Office 3,386,437
Patented June 4, 1968

3,386,437
COMPRESSION DEVICE FOR USE WITH A
BONE FRACTURE PLATE
Harry T. Treace, Germantown, Tenn., assignor to Richard
Manufacturing Company, Memphis, Tenn., a corporation of Tennessee
Filed Jan. 14, 1966, Ser. No. 520,610
7 Claims. (Cl. 128—92)

This invention relates to a compression device for reducing a bone fracture.

In some cases, physicians in reducing a bone fracture use the following procedure: (1) make an incision to expose the bone, (2) place a bone plate across the fracture, (3) attach one end of the bone plate to one of the broken pieces of bone by means of screws or the like, (4) attach a compression device to the other piece of bone, (5) compress the bone together at the break by pulling on the unattached end of the bone plate with the compression device, (6) fasten said unattached end to said other piece of bone by means of screws or the like, and (7) remove the compression device.

Heretofore, the compression devices which were used in the above-mentioned process had certain disadvantages, for example, one type of compression device had a tendency to turn or twist the two bone pieces as they were being drawn together. Another disadvantage resided in the necessity for exposing a relatively large area of the bone in order to accommodate and manipulate the compression device. The present invention is directed towards overcoming the above-mentioned and other disadvantages in compression devices for reducing bone fractures.

Thus, one of the objects of the present invention is to provide a compression device that is relatively narrow and elongated in a direction perpendicular to the movement of the two parts of the bone together and to provide a device in which the actuating piece thereof moves in said direction so that less bone is needed to be exposed than was heretofore necessary.

A further object is to provide such a device which gives better alignment of the broken bone ends than was heretofore possible.

A further object is to provide such a device that utilizes a mechanism in which a cam is provided to cause a movable member to pull the bone plate straight towards the other or stationary member of the device and without any twisting thereof.

A further object is to provide a very effective compression device which is easily operated.

A further object is generally to improve the design and construction of compression devices.

The means by which the foregoing and other objects of the present invention are accomplished and the manner of their accomplishment will be readily understood from the following specification upon reference to the accompanying drawing, in which:

FIG. 1 is a side elevational view of the device of the present invention shown in conjunction with a bone and bone plate after the fracture has been reduced.

FIG. 2 is a top plan view of that shown in FIG. 1.

FIG. 3 is a sectional view on an enlarged scale taken as on the line III—III of FIG. 2, but showing the parts before the bone pieces have been compressed.

FIG. 4 is a view similar to FIG. 3 but after the bone pieces have been compressed, after the bone plate has been attached at its loose end, and the compression device is ready to be removed.

FIG. 5 is a sectional view on an enlarged scale taken as on the line V—V of FIG. 1.

FIG. 6 is a sectional view on an enlarged scale taken as on the line VI—VI of FIG. 1.

Referring now to the drawings in which the various parts are indicated by reference characters, the letter B represents the bone that has been fractured as at F to divide the bone into two pieces B' and B". The letter P represents a typical bone plate which, in carrying out the procedure of reducing a fracture, is attached to bone piece B' as by means of the screws S with the bone plate overlying the fracture F and extending across the end of bone piece B", as best seen in FIG. 3. The bone plate P is provided with a hole H in the distal end thereof that extends across bone piece B". The function of compression device 11 of the present invention is to compress the two bone pieces B', B" together as shown in FIG. 4, and as will be better understood in the description of device 11 to follow hereinafter. After the bone pieces B', B" have been compressed by device 11 the screws S' are then screwed into the bone piece B" to securely hold the bone plate P in place and then device 11 is removed.

Referring now in more detail to compression device 11 of the present invention, device 11 comprises in general a first member 13, a second member 15, a movable yoke-like actuating piece 17, interconnecting means 19 slidably interconnecting actuating piece 17 with members 13, 15, and actuating means 21 for moving actuating piece 17.

Referring now in more detail to the parts of device 11, first member 13 is substantially block-like in construction and is elongated vertically. The lower end of first member 13 is offset to provide a foot member 23, which has a slightly concave lower surface as at 25 and which has a vertical bore 27 therethrough so that a screw 29 can be provided therein and screwed into the bone B" to stationarily fasten first member 13 to the bone B" in making ready for the compression process. It will be noted that when attached to bone piece B", first member 13 extends upwardly and outwardly away from bone piece B" and perpendicular to the axis of the bone B and the bone plate P. First member 13 is provided adjacent the upper end thereof with an integrally formed lateral extension 31 thereof which extends in the opposite direction from foot member 23. Lateral extension 31 adjacent the lower portion thereof is provided with a vertically extending reduced portion 33.

Second member 15 is substantially block-like in construction and is elongated vertically. Second member 15 includes at the lower end thereof a hook or lug 35 projecting downwardly and adapted to fit into hole H in bone plate P, as best seen in FIGS. 3 and 4. The upper end of second member 15 is provided with a bifurcated portion 37 which straddles reduced portion 33 and is pivotally attached thereto as by the horizontally-extending pin 39 which furnishes the pivot axis for pivoting movement of second member 15 between an open extended position away from first member 13 as best seen in FIG. 3, and a closed retracted position adjacent first member 13, as best seen in FIG. 4. Pin 39 extends transversely of device 11 and substantially perpendicular to the vertical plane of first and second members 13, 15 so that the movement above-described of second member 15 is directly towards and away from the first member.

Yoke-like actuating piece 17 comprises a cross-piece 41 extending above first and second members 13, 15 and substantially flat side pieces 43, 45 that are integrally formed with opposite side edges of cross piece 41 and depend downwardly therefrom in spaced apart relationship in sliding engagement with the opposite sides of first and second members 13, 15.

The interconnecting means 19 between actuating piece 17 and first and second members 13, 15 is preferably as follows: A pair of vertically spaced transverse pins 47, 49 respectively extend through transverse bores 51, 53 in first member 13 and out the opposite sides thereof to their termination in opposite end portions 47′, 47″, 49′, 49″. Side piece 43 is provided with a pair of vertically-spaced and vertically extending aligned slots 55, 57 through which end portions 47′, 49′ respectively extend. Similarly, side piece 45 is provided with a pair of vertically spaced and vertically extending aligned slots 59, 61 through which end portions 47″ and 49″ extend. Suitable means such as washers 63 and suitable retaining means (not shown) for the washers are provided on each of the end portions 47′, 47″, 49′, 49″. From the foregoing, it will be seen that the end portions of pins 47, 49 acting in conjunction with the slots 55, 57, 59, 61 provide guide means for guiding actuating piece 17 so that it moves vertically or perpendicular to bone B between a lower retracted position, as best seen in FIG. 3 and an upper extended position, as best seen in FIG. 4.

A third pin 65 extends transversely through second member 15 and out the opposite sides thereof to its termination in opposite end portions 65′, 65″. Third pin 65 is substantially parallel to pin 39 and to pins 47, 49. Side piece 43 is provided with a slot 67 that angles downwardly and inwardly towards an imaginary line projecting longitudinally through and beyond slots 55, 57. Similarly, a slot 69 is provided in side piece 45 opposite slot 67 and is likewise angled inwardly and downwardly towards an imaginary line projecting longitudinally through and beyond slots 59, 61. The end portions 65′, 65″ respectively extend through slots 67, 69 and therebeyond. Suitable means, similar to the means employed with pins 47, 49 is provided for third pin 65 for keeping the third pin in place, as for example, washers 63 and suitable retaining means not shown. It will be understood from the foregoing that pin 65 acting in conjunction with slots 67, 69 provide cam means for moving second member 15 between said open extended position shown in FIG. 3 and said closed retracted position shown in FIG. 4. When actuating piece 17 is moved between said retracted and extended positions. In other words, when actuating piece 17 is retracted, the second member 15 is opened or spread relative to first member 13, as best seen in FIG. 3, and when actuating piece 17 is extended, as seen in FIG. 4, the second member is closed.

The means 21 for moving actuating piece 17, as above-described, preferably comprises a screw 71 that is threadedly engaged in an internally threaded vertical bore 73 in cross piece 41. The lower end of screw 71 is turnably attached to first member 13 by any suitable means, as for example, the following: the lower end of screw 71 fits into an upwardly opening smooth socket 75 in first member 13, where it is retained by suitable means as a pin 77 provided in bore 79 in first member 13 and which pin has its end projecting into an annular groove 81 at the lower end of screw 71. The upper end of screw 71 is preferably provided with a knurled portion 83 for manual turning if desired, and a male fitting 85 above the knurled portion for turning by a wrench, if desired.

It will be understood that in using device 11 of the present invention the bone plate P is first attached to bone piece B′. Then, with the lug 35 extending into the hole H and with actuating piece 17 in a retracted position, as shown in FIG. 3, the foot member 23 is attached to bone piece B″ by the screw 29 as heretofore described. Care should be taken that the first and second members 13, 15 are in alignment with the bone plate P and the bone B. Next, the screw 71 is turned to cause the lug 35 to draw the bone plate P and bone piece B′ to the right and into the position shown in FIG. 4 whereupon the ends of the bone pieces are compressed together as shown in this figure. The screws S′ are then inserted as heretofore described. Then, the screw 29 is unscrewed so that device 11 can be removed.

From the foregoing description, it can be seen that a very effective compression device is provided in which the bone pieces are drawn directly towards one another without any twisting movement so that a more effective compression of the bone is provided. In addition, it will be seen that the device and the parts thereof are elongated vertically or in a direction perpendicularly away from the bone and take up only a minimum amount of space so that a minimum incision for exposure of the bone can be accomplished. Also, the upper end of screw 71 is at the most distal remote point from the bone whereby it can be conveniently manipulated, as opposed to some of the prior devices in which the actuating parts were comparatively hard to manipulate and were close to the bone.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A compression device for pulling two pieces of a fractured bone together with the use of a bone plate attached to one of the pieces of bone, said device comprising a first member including a distal end adapted to be attached to the other of said pieces of bone, a movable second member having a distal end and including means at said distal end for connecting said second member to said bone plate, a movable actuating piece, means slidably interconnecting said movable actuating piece respectively with said first member and said second member for movement of said movable actuating piece in a direction substantially perpendicular to the bone plate and to the bone to which said device is adapted to be attached between retracted and extended positions, said interconnecting means including means for relatively moving said distal ends of said first and second members towards one another responsive to movement of said movable actuating piece towards one of said positions and for moving said distal ends of said first and second members away from one another responsive to movement of said movable actuating piece towards the other of said positions, and means for moving said movable actuating piece between said extended and retracted positions.

2. The device of claim 1 in which said first member includes a foot portion at the distal end thereof, and in which said foot portion is provided with a hole therethrough adapted to receive a screw for attaching said first member to said other of said pieces of bone.

3. The device of claim 1 in which said means for relatively moving said distal ends of said first and second members includes cam means.

4. The device of claim 1 in which said second member includes a lug at the distal end thereof that is adapted to extend into a hole in said bone plate with which said device is adapted to be used.

5. The device of claim 1 in which said movable actuating piece is provided with an internally threaded bore, and in which said means for moving said movable actuating piece comprises a screw threadedly engaged in said internally threaded bore, and means turnably connecting the end of said screw to one of said members.

6. The device of claim 1 in which means is provided for pivotally connecting said second member to said first member for pivoting movement of said second member towards and away from said first member.

7. A compression device for pulling two pieces of a fractured bone together with the use of a bone plate attached to one of said pieces of bone and having a hole therein, said device comprising an elongated first member having an upper end and a lower distal end, said first member including a foot portion at the distal end thereof, said foot portion being provided with a hole therethrough adapted to receive a screw for attaching said first member to the other of said pieces of bone, a movable second member having an upper end and a lower distal end, said first member adjacent the upper end thereof being provided with a lateral extension over said second member, pivot means pivotally connecting said second member adjacent the upper end thereof to said lateral extension for pivoting movement of said second member towards and away from said first member, said second member including means at the distal end thereof for connecting said second member to said bone plate in said hole, a movable yoke-like actuating piece including a cross piece and spaced apart side pieces depending from said cross piece and respectively slidably engaging opposite sides of said first and second members, said cross piece being provided with an internally threaded vertical bore, a pair of vertically-spaced transverse pins extending through said first member and out the opposite sides thereof to their termination in opposite end portions, each of said side pieces being provided with a pair of vertically spaced and vertically extending aligned slots cooperating with the end portions of said pair of pins to guide said movable actuating piece in vertical movement relative to said first and second members between upper-extended and lower-retracted, positions, means for moving said actuating piece between said upper-extended and lower-retracted positions comprising a screw threadably engaged in said internally threaded bore and means turnably connecting the end of said screw to said first member, a third transverse pin extending through said second member and out the opposite sides thereof to its termination at opposite end portions, eahc of said side pieces being provided with an angled slot at an angle relative to said aligned slots cooperating with the end portions of said third pin to cause said second member to move towards said first member when said actuating piece is moved upwardly towards an extended position upon turning of said screw.

References Cited

UNITED STATES PATENTS

| | | | |
|---|---|---|---|
| 2,002,021 | 5/1935 | Rouse | 128—84 |
| 3,244,170 | 4/1966 | McElvenny | 128—92 D |

OTHER REFERENCES

"Compression Plate Fixation and the Effect of Different Types of Internal Fixation on Fracture Healing," by L. D. Anderson, Journal of Bone and Joint Surgery, January 1965, vol. 47–A, No. 1, p. 191.

Journal of Bone and Joint Surgery, July 1965, vol. 47–A, No. 5, advertising, p. 41 (Wright manufacturing Co.).

RICHARD A. GAUDET, *Primary Examiner.*

R. L. FRINKS, *Examiner.*